(12) United States Patent
Gulati et al.

(10) Patent No.: US 10,134,139 B2
(45) Date of Patent: Nov. 20, 2018

(54) DATA CONTENT INTEGRITY IN DISPLAY SUBSYSTEM FOR SAFETY CRITICAL USE CASES

(71) Applicant: QUALCOMM Incorporated, San Diego, CA (US)

(72) Inventors: Rahul Gulati, San Diego, CA (US); Alex Kwang Ho Jong, San Diego, CA (US); John Chi Kit Wong, Markham (CA); Sanjay Gupta, North York (CA); Ike Ikizyan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 10 days.

(21) Appl. No.: 15/458,488

(22) Filed: Mar. 14, 2017

(65) Prior Publication Data

US 2018/0165814 A1 Jun. 14, 2018

Related U.S. Application Data (60) Provisional application No. 62/433,658, filed on Dec. 13, 2016.

(51) Int. Cl.
*G06K 9/00* (2006.01)
*G06T 7/11* (2017.01)

(52) U.S. Cl.
CPC ...... *G06T 7/11* (2017.01); *G06T 2207/20021* (2013.01); *G06T 2207/20104* (2013.01); *G06T 2207/30252* (2013.01)

(58) Field of Classification Search
None
See application file for complete search history.

(56) References Cited

U.S. PATENT DOCUMENTS

| | | | |
|---|---|---|---|
| 4,780,755 A | 10/1988 | Knierim | |
| 5,038,210 A | 8/1991 | Deckelmann et al. | |
| 5,537,145 A | 7/1996 | Miseli | |
| 5,861,882 A | 1/1999 | Sprenger et al. | |
| 5,920,340 A | 7/1999 | Man et al. | |
| 6,101,620 A | 8/2000 | Ranganathan | |
| 6,717,625 B1 | 4/2004 | Thielemans | |
| 6,726,103 B1 | 4/2004 | Motta et al. | |
| 6,839,055 B1 | 1/2005 | Nguyen | |

(Continued)

OTHER PUBLICATIONS

Office Action from U.S. Appl. No. 14/864,348, dated Oct. 3, 2017, 20 pp.

(Continued)

*Primary Examiner* — Hadi Akhavannik
(74) *Attorney, Agent, or Firm* — Shumaker & Sieffert, P.A.

(57) ABSTRACT

Techniques of this disclosure may include processing one or more regions-of-interest (ROI) of an input image through a model of a display processor, calculating a first data integrity check value on the one or more ROI of the input image after processing through the model, processing the input image by the display processor, calculating a second data integrity check value on the one or more ROI by the display processor after the display processor processes the input image, comparing the first data integrity check value to the second data integrity check value, and generating an interrupt if the comparison indicates that the first data integrity check value and the second data integrity check value do not match.

30 Claims, 7 Drawing Sheets

(56) References Cited

U.S. PATENT DOCUMENTS

| | | | |
|---|---|---|---|
| 7,062,696 B2 | 6/2006 | Barry et al. | |
| 7,085,408 B1 | 8/2006 | Chung-Chi | |
| 7,313,696 B2 | 12/2007 | De | |
| 7,657,807 B1 | 2/2010 | Watkins et al. | |
| 8,018,492 B2 | 9/2011 | Musunuri et al. | |
| 8,605,797 B2* | 12/2013 | Shao | H04N 19/89 375/240.24 |
| 8,636,367 B1 | 1/2014 | Callison et al. | |
| 8,736,679 B2 | 5/2014 | Jackson | |
| 8,842,123 B2* | 9/2014 | Williams | G06T 1/00 345/501 |
| 9,117,123 B2 | 8/2015 | Nix | |
| 9,251,598 B2 | 2/2016 | Wells et al. | |
| 9,357,208 B2 | 5/2016 | Gupta et al. | |
| 9,955,150 B2* | 4/2018 | Gulati | G09G 3/006 |
| 2003/0164835 A1 | 9/2003 | Burk et al. | |
| 2007/0011407 A1 | 1/2007 | Kuehl et al. | |
| 2007/0040841 A1 | 2/2007 | Kim | |
| 2007/0046670 A1* | 3/2007 | Hedrick | G01C 23/00 345/440 |
| 2007/0182681 A1 | 8/2007 | Kim | |
| 2007/0296822 A1 | 12/2007 | Lan et al. | |
| 2008/0129826 A1* | 6/2008 | Musunuri | H04N 17/004 348/192 |
| 2008/0141072 A1 | 6/2008 | Kalgren et al. | |
| 2008/0158363 A1 | 7/2008 | Myers | |
| 2009/0167515 A1* | 7/2009 | Scherzinger | B60K 35/00 340/438 |
| 2009/0213226 A1 | 8/2009 | Man | |
| 2011/0035631 A1 | 2/2011 | Bhinge | |
| 2011/0050877 A1 | 3/2011 | Ookubo et al. | |
| 2011/0099425 A1* | 4/2011 | Liu | G09G 3/006 714/35 |
| 2011/0102650 A1 | 5/2011 | Shoyama | |
| 2011/0298978 A1 | 12/2011 | Strein et al. | |
| 2012/0110382 A1 | 5/2012 | Tang et al. | |
| 2012/0127324 A1 | 5/2012 | Dickins et al. | |
| 2012/0221884 A1 | 8/2012 | Carter et al. | |
| 2013/0083204 A1 | 4/2013 | Solhusvik et al. | |
| 2013/0145225 A1 | 6/2013 | Lin et al. | |
| 2014/0059252 A1 | 2/2014 | Stettin et al. | |
| 2014/0085324 A1* | 3/2014 | Charvet | G06T 7/0004 345/589 |
| 2014/0195870 A1 | 7/2014 | Ma | |
| 2014/0292997 A1 | 10/2014 | Hung | |
| 2014/0362295 A1 | 12/2014 | Suzuki | |
| 2015/0277838 A1 | 10/2015 | Gyllensward | |
| 2015/0281742 A1* | 10/2015 | Staudenmaier | H04N 19/89 375/240.27 |
| 2017/0026605 A1 | 1/2017 | Aubineau et al. | |

OTHER PUBLICATIONS

Bigelow, "After years of delays, NHTSA issues backup camera rules," autoblog.com, Mar. 31, 2014, 2 pp.

Non-Final Rejection from U.S. Appl. No. 14/864,348, dated Jun. 9, 2016, 18 pp.

Final Rejection from U.S. Appl. No. 14/864,348, dated Sep. 29, 2016, 15 pp.

Non-Final Rejection from U.S. Appl. No. 14/864,348, dated Feb. 17, 2017, 19 pp.

Final Rejection from U.S. Appl. No. 14/864,348, dated Jun. 6, 2017, 19 pp.

* cited by examiner

DATA CONTENT INTEGRITY IN DISPLAY SUBSYSTEM FOR SAFETY CRITICAL USE CASES

This application claims the benefit of U.S. Provisional Application Ser. No. 62/433,658, filed Dec. 13, 2016, the entire content of each of which is incorporated herein by reference.

TECHNICAL FIELD

The disclosure relates to testing of a display subsystem for data content integrity.

BACKGROUND

An automobile, or other vehicle, may include a display device that can provide information, data, images, videos, and the like to the operator of the vehicle. For example, the display device may display the video captured by a rear view camera of an automobile to assist the driver of the vehicle in safely reversing out of a parking space. Further, the display device may be part of, or operably coupled to, an automotive advanced driver assistance system (ADAS) such that the display device may also display blind spot warnings to alert the driver that there are vehicles situated at the driver's blind spot.

A safety critical ADAS may be required to fulfill functional safety requirements, such as those mandated by ISO 26262 (functional safety standard for road vehicles). One functional safety requirement is to ensure data content integrity for one or more areas of image data sent to a display. A failure to display correct image data may lead to a violation of defined safety goals for an automotive application. Example automotive applications that may use displays include a rear view camera system, front collision warning systems, traffic sign recognition systems, parking assistance systems, instrument cluster displays providing so-called "tell-tale" sign information, etc.

SUMMARY

In general, aspects of the disclosure are directed to techniques for the testing of content integrity in a display subsystem. In certain applications, for example, if the display subsystem is included in, or operably coupled to, an automotive advanced driver assistance system (ADAS) or a flight control system for controlling an aircraft, the integrity of the content displayed by the display subsystem may be important to maintaining the safety of the driver and passengers of the vehicle. The display subsystem may process images and perform image operations on such images before those images are displayed by the display device. If the display subsystem is faulty and introduces errors into images during image processing, then the user may not be able to rely on the accuracy of the images that are displayed by the display device. In the example of the display device that displays the video captured by the rear view camera or displays warning or other "tell-tale" icons, the display subsystem may impact the safety of the driver and passengers, as well as pedestrians and occupants of other vehicles in a negative fashion if the display subsystem malfunctions.

In one example of the disclosure, a method of checking the integrity of an image comprises processing one or more regions-of-interest (ROI) of an input image through a software model of a display processor, calculating a first data integrity check value on the one or more ROI of the input image after processing through the software model of the display processor, processing the input image by the display processor, calculating a second data integrity check value on the one or more ROI by the display processor after the display processor processes the input image, comparing the first data integrity check value to the second data integrity check value, and generating an interrupt if the comparison indicates that the first data integrity check value and the second data integrity check value do not match within a predetermined margin of error.

In another example of the disclosure, an apparatus configured to check the integrity of an image comprises a processor, a display processor, and a comparison circuit, wherein the processor is configured to process one or more regions-of-interest (ROI) of an input image through a software model of a display processor, and calculate a first data integrity check value on the one or more ROI of the input image after processing through the software model of the display processor, wherein display processor is configured to process the input image by the display processor, and calculate a second data integrity check value on the one or more ROI by the display processor after the display processor processes the input image, and wherein the comparison circuit is configured to compare the first data integrity check value to the second data integrity check value, and generate an interrupt if the comparison indicates that the first data integrity check value and the second data integrity check value do not match within a predetermined margin of error.

In another example of the disclosure, an apparatus configured to check the integrity of an image comprises means for processing one or more regions-of-interest (ROI) of an input image through a software model of a display processor, means for calculating a first data integrity check value on the one or more ROI of the input image after processing through the software model of the display processor, means for processing the input image by the display processor, means for calculating a second data integrity check value on the one or more ROI by the display processor after the display processor processes the input image, means for comparing the first data integrity check value to the second data integrity check value, and means for generating an interrupt if the comparison indicates that the first data integrity check value and the second data integrity check value do not match within a predetermined margin of error.

In another example, this disclosure describes a computer-readable storage medium storing instructions that, when executed, cause one or more processors to process one or more regions-of-interest (ROI) of an input image through a software model of a display processor, calculate a first data integrity check value on the one or more ROI of the input image after processing through the software model of the display processor, process the input image by the display processor, calculate a second data integrity check value on the one or more ROI by the display processor after the display processor processes the input image, compare the first data integrity check value to the second data integrity check value, and generate an interrupt if the comparison indicates that the first data integrity check value and the second data integrity check value do not match within a predetermined margin of error.

The details of one or more aspects of the disclosure are set forth in the accompanying drawings and the description below. Other features, objects, and advantages of the disclosure will be apparent from the description and drawings, and from the claims.

DETAILED DESCRIPTION

Examples of this disclosure are directed to techniques, structures, and devices for testing data content integrity in display subsystems, such as display subsystems for safety critical use cases (e.g., instrument clusters, rear view camera application, etc.). Other examples of this disclosure may further include techniques, structures, and devices for performing concurrent online data integrity check value calculations for user configurable regions-of-interest within a safety critical display image.

To ensure that the display subsystem is operating correctly without fault, a display subsystem may perform testing related to the integrity of the content to be displayed to detect operational faults that may occur while the display subsystem processes the content for display by a display device. The techniques of this disclosure specifically relate to concurrent and/or online testing of content integrity for display. In this context, testing of content integrity may include testing that confirms that the content that is going to be displayed is the same as the content that was expected to be displayed. Concurrent testing of the display subsystem may be a continuous testing of the display subsystem while the computing device is powered on. Online testing of the display subsystem may include testing of the display subsystem while the computing device and the subsystem are powered on and performing its normal functionality. In other words, a computing device may perform testing of the display subsystem while the computing device is powered on and in use by a user without entering into a dedicated test mode, and without switching off the display device. Thus, if the computing device is an ADAS, the user of the ADAS may use the ADAS to, for example, view video streamed from a rear view camera to a rear view camera display and/or view warning or tell-tale icons in an instrument cluster while the ADAS performs concurrent and online testing of the display subsystem.

Such concurrent and online testing of the display subsystem may detect operational faults of the display subsystem, which may include a blank screen, a frozen frame, or an incorrect display of image content. Operational faults may include permanent faults, intermittent faults, and transient faults. Permanent faults may be faults that remain in existence indefinitely if no corrective action is taken. Such faults may be residual design or manufacturing faults. Intermittent faults may appear, disappear, and reappear repeatedly. Such faults may be difficult to predict but their effects may be highly correlated. When such intermittent faults appear, the display subsystem may work correctly most of the time but may fail under atypical environmental conditions. Transient faults may appear and disappear quickly, and such faults may not be correlated. Such transient faults are often induced by random environmental disturbances.

A computing system configured to perform the techniques of this disclosure may perform concurrent and online testing of display content integrity in order to detect faults of the display subsystem. This disclosure describes techniques for ensuring data content integrity in display sub-systems. The techniques of this disclosure may have application in automotive display systems, avionics display systems, or any other display system where it may be beneficial to ensure that the image data intended to be displayed is actually displayed.

In some example display systems, a data integrity check value may be generated for an entire incoming frame to a display system. Such a data integrity check value may be any type of value generated to check the validity of raw or processed data (e.g., image data). A data integrity check value may be any type of value that may be generated by performing an operation on data before processing (e.g., a region-of-interest of image data). Another data integrity check value may be performed on the same data after some processing, transmission, memory storage, etc. The two generated data integrity check values may then be compared to determine whether or not the data has changed. In some examples, such a data integrity check value is only generated prior to any display processing by a display processor.

Examples of data integrity check values may be values generated by a cyclic redundancy check (CRC) code, a hash function, checksums, a multiple independent signature register (MISR, e.g., MISR value or MISR signature), or other values generated through other techniques. Display systems may use a MISR algorithm to implement a cyclic redundancy check to aid in verification of the integrity of the display. In some examples, data is collected for a programmable number of frames before updating the MISR. The register value can be compared to an expected value to validate if the display hardware is behaving properly.

As will be explained in more detail below, in examples of this disclosure, the MISR hardware is a standalone block that is instantiated at various points in a display processing pipeline. In some examples, a display system may include a MISR block for each display peripheral output that can collect a MISR signature on the final composed image being sent to the display peripheral. In some examples, each display MISR block can run concurrently and independently.

A CRC code is an error-detecting code that is often used to detect changes in data. CRCs are generated using cycle codes that produce a value that is a function of function that maps data of an arbitrary size to data of a fixed size. Hash functions are sometimes used in a hash table for accelerated lookup of duplicated records. Hash functions may also be used to generate data integrity check values for image data before and after processing. A checksum is data produced by an algorithm operating on data (e.g., image data) in order to detect errors during transmission, processing, or storage.

To ensure the integrity of image data after being processed by a display processor or other processing circuit, this disclosure proposes calculating a data integrity check value (e.g., a CRC, MISR, etc.) based on a software model of the processing to be performed by such a display processor or processing circuit. For example, one or more user-configurable regions-of-interest (ROI) of input image data (e.g., safety critical image data) may be processed by the software model and a data integrity check value (e.g., an Input MISR)

may be calculated on the output ROI of the software model. The image data may then be processed by the display processor for eventual display. After processing by the display processor, another data integrity check value (e.g., an Output MISR) may be generated for the ROI of the image to be displayed (i.e., the output image). The Input MISR and the Output MISR may be supplied to a comparator circuit. If the Input MISR and Output MISR match (e.g., within some margin for error), the output image is determined to be correct and is displayed. If the Input MISR and Output MISR do not match (e.g., are outside some margin for error), an interrupt is generated and an alert and/or recovery process may be initiated.

As will be explained in more detail below, techniques of this disclosure may include processing one or more ROI of an input image through a model of a display processor, calculating a first data integrity check value on the one or more ROI of the input image after processing through the model, processing the input image by the display processor, calculating a second data integrity check value on the one or more ROI by the display processor after the display processor processes the input image, comparing the first data integrity check value to the second data integrity check value, and generating an interrupt if the comparison indicates that the first data integrity check value and the second data integrity check value do not match. The display processor in this example may be a part of a computing device, such as an ADAS, and the like, or may be a standalone module that may perform the content integrity tests described throughout this disclosure.

Figure 1:
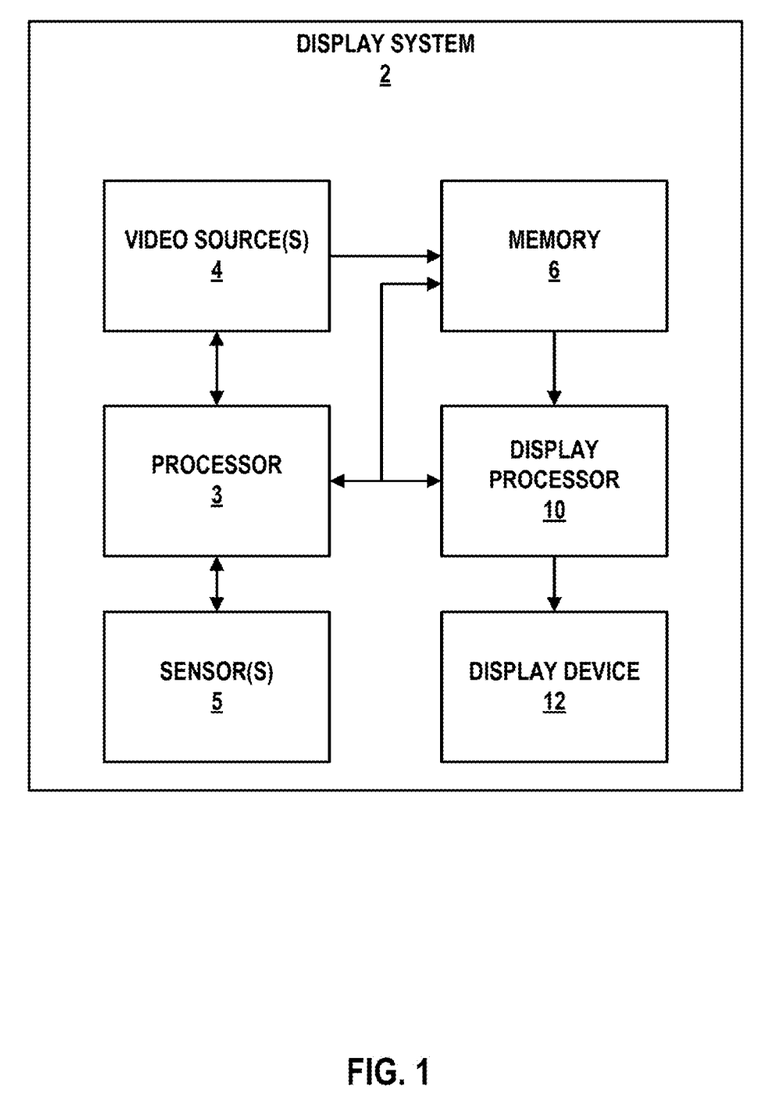
FIG. 1 is a block diagram illustrating an example display system that may be configured to implement one or more examples of this disclosure.

FIG. 1 is a block diagram illustrating an example display system that may be configured to implement one or more aspects of this disclosure. In the example of FIG. 1, display system 2 may be a system that includes processor 3, memory 6, sensors 5, and display processor 10. Processor 3 may be any type of processor including a central processing unit (CPU). Display system 2 may also be operably coupled to one or more video sources 4 and display device 12. Display processor 10 may be part of the same integrated circuit (IC) as processor 3, may be external to the IC or ICs that include processor 3, or may be formed in the IC that is external to the IC that includes processor 3. It should be understood that display system 2 may include modules and units other than the ones in the example of FIG. 1, and that, in some examples, display system 2 may also not include one or more of the modules and units in the example of FIG. 1. For example, display system 2 may not necessarily include or be operably coupled to one or more video sources 4.

Display system 2 may be any suitable device or system that includes a display subsystem or processor for processing images that are displayed by display device 12 included in or operably coupled to display system 2. Examples of display system 2 may include a computing device, such as a desktop computer, a laptop computer, a tablet, a smartphone, a specialized computing device, such as an ADAS, a wearable device such as a head mounted display, and the like. Display system 2 may be incorporated into larger systems, including automobiles, airplanes, watercraft, farm equipment, construction equipment, or any other use case that may include display equipment used to display safety critical information.

In one example of the disclosure, display system 2 may be included in an automobile that displays information. In some examples, display system 2 may display information in accordance with an ADAS. Display system 2 may include one or more displays for displaying, e.g., information and/or icons in an instrument cluster of an automobile, displaying information and/or icons associated with climate control systems of an automobile, displaying information and/or icons associated with ADAS systems, displaying information and/or icons associated with radio and entertainment systems, displaying information and/or icons associated with rearview cameras and/or surround cameras, displaying information and/or icons for a heads-up display, or any other type of display system of a vehicle.

Display system 2 may be hardware for processing images and video that is displayed by display device 12 that is part of a vehicle control system or vehicle safety system to aid the operation of a vehicle. Display system 2 may also be hardware for processing captured video that is to be displayed by a head mounted display, an augmented reality headset, and the like, and may process video captured by cameras that are displayed by display device 12 that is a head mounted display. In another example, display system 2 may be hardware for processing video captured by a drone, such that display system 2 may be part of the computing system that wirelessly receives video captured by cameras coupled to the drone. Display system 2 may also be hardware that is part of a flight control system that processes critical safety information for operating an aircraft, such as altimeter readings, radar images, and the like, for display by display device 12 in the cockpit of the air craft. In other examples, display system 2 may be any other suitable hardware for processing images that are to be displayed by a display device, such as display device 12.

Video source(s) 4 may include video cameras, graphics processing units, and other suitable video sources from which display processor 10 may receive images and video for display at display device 12. In an example where video source(s) 4 is a part of or coupled to an ADAS, video source(s) 4 may include rear view cameras, front view cameras, side view cameras, surround cameras and the like that capture videos and/or images of the exterior surroundings of the vehicle that includes the ADAS. Video source(s) 4 may, for example, include a rearview/surround camera that assists the driver of the vehicle in backing up the vehicle by capturing a video of the rear exterior surroundings of the vehicle that is displayed by display device 12. Video source(s) 4 may also include cameras that capture video that are displayed by display device 12 that is part of a head mounted display, an augmented reality headset, and the like, or may be cameras mounted on a drone that transmits video wirelessly to display device 12.

Video source(s) 4 may also include additional cameras that capture videos that are displayed by display device 12 of blind spots that a driver of the vehicle may have to assist the driver in collision avoidance. It should be understood that, in some examples, display system 2 may not include or be operably coupled to video source(s) 4. Video source(s) 4 may also include cameras that capture video that are displayed by display device 12 that is part of a head mounted display, an augmented reality headset, and the like, or may be cameras mounted on a drone that transmits video wirelessly to display device 12. In other examples, video sources 4 may include images generated by processor 3 for display by display device 12. Video source(s) 4 may further include other sensors that may detect and/or generate information that may be used in generating information and/or images for display. Such video sources may include sensors for parking assistance systems, sensors for adaptive cruise controls, sensors for lane keeping assistance systems, sensors for pedestrian/objection detection for collision avoidance, sensors for night visions systems, and the like.

Memory 6 may include an output buffer that stores such images for output by display device 12. For example, memory 6 may store images or video frames received from video sources 4. Display processor 10 may include one or more hardware units that retrieves images stored in memory 6, performs one or more image processing operations on the retrieved images, and outputs the processed images to display device 12 for display by display device 12. In other words, display processor 10 retrieves an image from memory 6 and may output values that cause the pixels of display device 12 to illuminate to display the image. In some examples, display processor 10 may be configured to perform image processing operations on the image retrieved from memory 6 to be displayed by display device 12. Such image processing operations may include format converting, scaling, rotation, blending, and compositing, layering of the image with additional graphics, and the like. In general, display processor 10 may perform some operations that are generally not expected to change the content of images in some use cases (e.g., compositing operations), and may perform other operations that are generally expected to change the content of image in such use cases (e.g., by adjusting hue, saturation, brightness, etc.).

The configuration of display processor 10 in FIG. 1 is exemplary. In other examples, display processor 10 may be configured to receive visual content from any source, such as any CPU (e.g., processor 3), any GPU, any DSP, any video processing unit, any camera processing unit, any image processing unit, any pixel processing unit, any memory storing visual content, or any other source. As one example, display processor 10 may be configured to receive visual content data from another device (e.g., another display system, a server, or any device different from display system 2 to which display system 2 2 may be configured to permanently or temporarily communicatively couple).

As used herein, the term "visual content" includes but is not limited to any graphics data, graphical data, video data, image data, pixel data, graphics content, graphical content, video content, image content, pixel content, and/or any other type of content that may be displayed.

Display processor 10 may be configured to perform any techniques described herein with respect to any source of visual content (e.g., any processing unit or any memory storing visual content). For example, while FIG. 1 is described with display processor 10 being configured to fetch and process visual content (e.g., one or more image layers) from memory 6, such as a frame buffer, display processor 10 may be configured to fetch and process visual content from any processing unit configured to process visual content and/or any memory configured to store visual content (e.g., any on-chip memory of any processing unit configured to process visual content, any memory external to any processing unit configured to process visual content, or any other memory).

Display processor 10 may utilize a tile-based architecture to process visual content. In other examples, display processor 10 may utilize a line-based architecture. In such examples, display processor 10 may be configured to implement one or more techniques of this disclosure for line-based display processing as well as tile-based display processing.

In some examples, a tile is an area representation of pixels comprising a height and width with the height being one or more pixels and the width being one or more pixels. In such examples, tiles may be rectangular or square in nature. In other examples, a tile may be a shape different than a square or a rectangle. Display processor 10 may pre-fetch or fetch multiple image layers (e.g., foreground and background) from memory (e.g., a frame buffer to which a processor (e.g., processor 3) outputs graphical data in the form of pixel representations and/or other memory). Display processor 10 may process pixels from multiple layers. Example processing that may be performed by display processor 10 may include up-sampling, down-sampling, scaling, rotation, and other pixel processing. For example, display processor 10 may process pixels associated with foreground image layers and/or background image layers. Display processor 10 may blend pixels from multiple layers, and write back the blended pixels into memory in tile format. Then, the blended pixels are read from memory in raster format and sent to display device 12 for presentment.

Display device 12 may be included in or operably coupled to display system 2 to display image content after processing by display processor 10. Display device 12 may be a liquid crystal display (LCD), an organic light emitting diode display (OLED), a cathode ray tube (CRT) display, a plasma display, or another suitable type of display device.

Processor 3 may be a microprocessor, such as a central processing unit (CPU) configured to process instructions of a computer program for execution. Processor 3 may comprise a general-purpose or a special-purpose processor that controls operation of display system 2. In some examples, processor 3 may include or be coupled to a digital signal processor (DSP) or graphics processing unit (DSP) that generates or processes images for display by display device 12. A user may provide input to display system 2 to cause processor 3 to execute one or more software applications. The software applications that execute on processor 3 may include, for example, an operating system for the display system 2, a graphical user interface application or another program. As will be explained in more detail below, processor 3 may be configured to processor images or portions of images (e.g., regions-of-interest) through a software model of display processor 10. In this way, processor 3 may, in effect, predict how display processor 10 will affect an image. Processor 3 may calculate a data integrity check value (e.g., CRC, MISR, etc.) on both the input image and/or calculate a data integrity check value on the result of the input image processed by the software model of display processor 10. Display processor 10 may also calculate data integrity check values at various stages of displaying processing. The data integrity check values calculated by processor 3 may be compared to the data integrity check values calculated by display processor 10 in order to verify whether or not the image content to be displayed is correct (e.g., is unchanged within some margin for error) or is not correct (e.g., is unchanged in a manner which suggest the display system has malfunctioned).

Memory 6 may include one or more volatile or non-volatile memories or storage devices, such as, e.g., random access memory (RAM), static RAM (SRAM), dynamic RAM (DRAM), erasable programmable ROM (EPROM), electrically erasable programmable ROM (EEPROM), Flash memory, a magnetic data media or an optical storage media. In some examples, memory 6 may store fully formed images received from video sources 4. Display processor 10 may retrieve the image from memory 6 and output values that cause the pixels of display device 12 to illuminate to display the image. In some examples, display processor 10 may be configured to perform 2D operations on data to be displayed, including scaling, rotation, blending, and compositing. Display device 12 may be the display of display system 2 that displays the image content processed by display processor 10.

Display system 2 may include additional modules or units not shown in FIG. 1 for purposes of clarity. In some examples, a user may provide input to display system 2 via one or more input devices (not shown) such as a keyboard, a mouse, a microphone, a touch pad or another input device that is coupled to display system 2 via a user interface. Furthermore, the various hardware units shown in display system 2 may not be necessary in every example of display system 2. For example, video sources 4 and display device 12 may be external to display system 2.

In accordance with one aspect of the present disclosure, processor 3 may be configured to process one or more regions-of-interest (ROI) of an input image through a model of display processor 10. Processor 3 may be further configured to calculate a first data integrity check value on the one or more ROI of the input image after processing through the model. Display processor 10 may then process the input image for display and calculate a second data integrity check value on the one or more ROI by after processing the input image. Display system 2 may then compare the first data integrity check value to the second data integrity check value, and generate an interrupt if the comparison indicates that the first data integrity check value and the second data integrity check value do not match. In response to the interrupt, display system 2 may issue an audible, visible, and/or haptic warning to the user. In other examples, in response to the interrupt, display system 2 may also initiate a self-recovery processor in which error produced by display processor 10 may be repaired.

Figure 2:
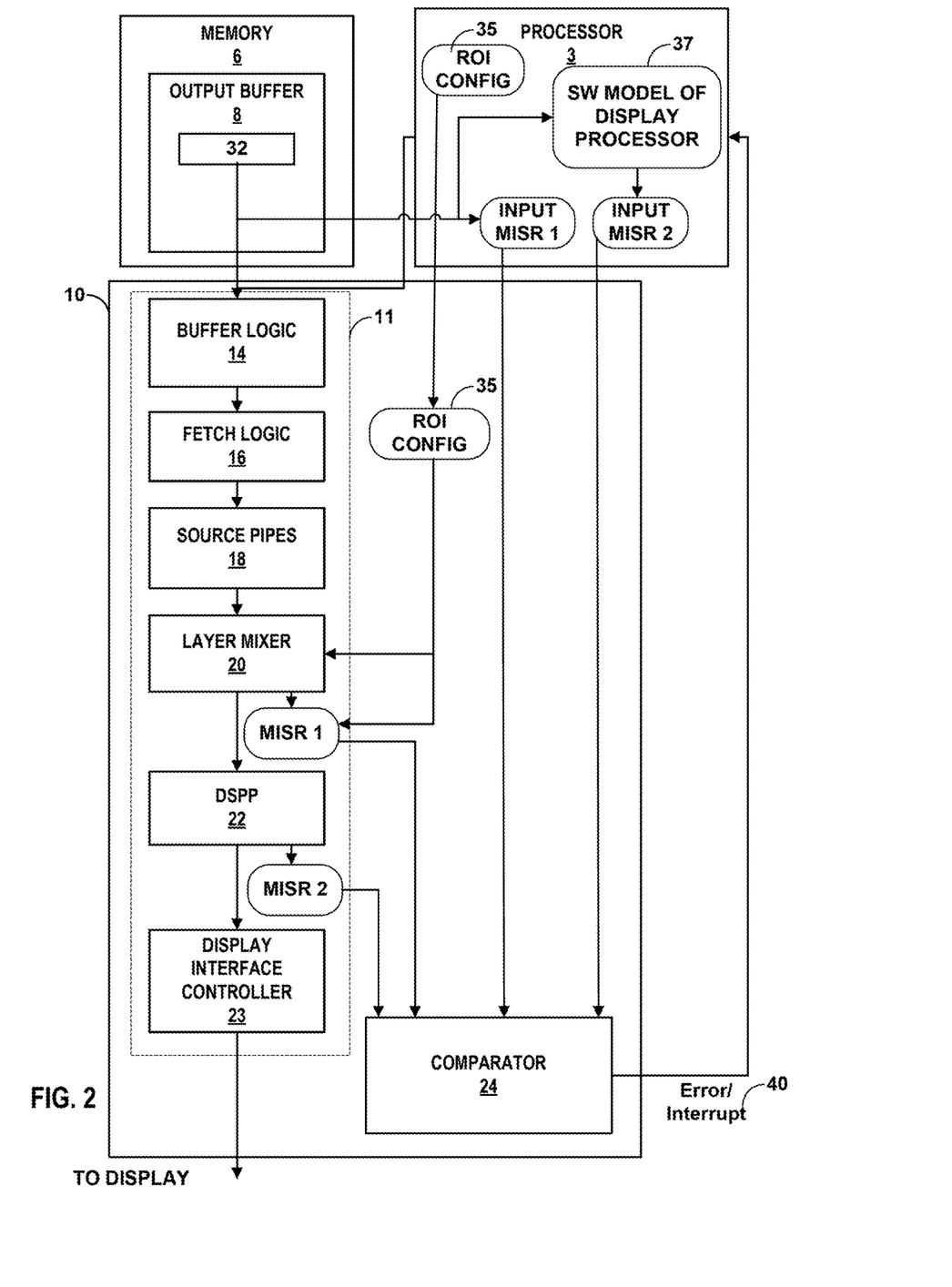
FIG. 2 is a block diagram illustrating the example display system of FIG. 1 in further detail.

FIG. 2 is a block diagram illustrating the example display system of FIG. 1 in further detail. As shown in FIG. 2, display processor 10 may include buffer logic 14, fetch logic 16, source surface processor pipes 18, layer mixer 20, destination surface processor (DSPP) 22, display interface controller 23, and comparator 24. Display processor 10 may include additional modules or units not shown in FIG. 2 for purposes of clarity. For example, display system 2 may include additional modules and units for performing hardware-accelerated image processing. Furthermore, the various modules and units shown in display processor 10 may not be necessary in every example of display processor 10.

In the example of FIG. 2, image 32 may be a frame of a video from video sources 4 or any other image (e.g., tell-tale icons for an instrument cluster) that is to be processed by display processor 10 for display by display device 12. In general, a tell-tale may be any icon on a vehicle display that provides some information about the vehicle or the operating environment of the vehicle. Tell-tale icons may include a speedometer, a fuel gauge, warning lamps, and the like. Display system 2 may store image 32 in memory 6, such as in output buffer 8. Display system 2 may capture or generate image 32 during the normal course of operations while display system 2 is powered on and operating normally without entering into a dedicated test mode.

Fetch logic 16 and buffer logic 14 may respectively retrieve an image from output buffer 8 of memory 6 for display by display device 12 and store the image retrieved by display processor 10 from memory 6 for further processing by the other hardware units of display processor 10. Source surface processor pipes 18 may receive an image from buffer logic 14 and fetch logic 16, and may perform format conversion and quality improvement for source surfaces of videos and images. For example, source surface processor pipes 18 may process a received image by performing color space conversion, content adaptive contrast enhancement, flip operations, and the like on the received image, and may output the processed image to layer mixer 20.

Layer mixer 20 may receive the image from source surface processor pipes 18 and may perform blending and mixing of the image with one or more other surfaces. For example, layer mixer 20 may perform alpha blending, color generation, setting of a transparency color key, blending of surfaces in arbitrary order, and blending in linear space. For example, display processor 10 retrieves an image from memory 6 that is one frame of a video captured by video sources 4 for processing. Layer mixer 20 may receive the image, mix the image with one or more additional graphical surfaces or images, and output the mixed image. For example, layer mixer 20 may layer the frame of the video captured by video sources 4 with one or more surfaces that include a graphical trajectory lines that indicate the vehicle's trajectory as it backs up according to the current steering angle of the vehicle, GUI menu options, and the like. Layer mixer 20 may output the blended/mixed image to DSPP 22. In some examples of the disclosure, when processing some ROIs of a display for an ADAS system, layer mixer 20 may be expected to not alter the pixels in the ROIs.

DSPP 22 may perform conversion, correction, and adjustments on the image received from layer mixer 20 based on particular characteristics of display device 12. For example, DSPP 22 may perform operations for sunlight visibility improvement, content adaptive backlight scaling, panel color correction, gamma correction, dithering, picture adjustments, and the like. Once DSPP 22 has completed its image operations on the image, display processor 10 may output the processed image to display device 12 via, for example, a display interface controller (not shown) for display by display device 12. In some examples of the disclosure, when processing some ROIs of a display for an ADAS system, DSPP 22 may be expected to alter the pixels in the ROIs.

Buffer logic 14, fetch logic 16, source surface processor pipes 18, layer mixer 20, and DSPP 22 may form display subsystem pipeline 11 through which images received by display processor 10 for display at display device 12 are processed. For example, for each image retrieved from memory 6 by display processor 10, the image may be processed in order by each of buffer logic 14, fetch logic 16, source surface processor pipes 18, layer mixer 20, and DSPP 22, respectively. Display subsystem pipeline 11 may include additional hardware units not depicted in FIG. 2 that are configured to perform image processing operations on images received by display processor 10. Display subsystem pipeline 11 may also include fewer hardware units than depicted in the example of FIG. 2.

To ensure the integrity of the display subsystem pipeline 11, display processor 10, processor 3, and display processor 10 may be configured to calculate data integrity check values on one or more regions-of-interest (ROIs) on image data to be processed by display processor 10. As will be discussed in more detail below, the ROIs may be user-configurable and may indicate areas of an image to be displayed where it is preferable to verify the integrity of the image displayed. For example, user-configurable ROIs may include tell-tale icons in an instrument cluster (e.g., warning and other information gauges) or image data from a rearview camera system. According to the techniques of this disclosure, data integrity check values may be computed for each of a plurality of ROIs of image, may be calculated on groups of ROIs, or may be calculated for an entire image. The locations of the ROIs of images to be processed by display processor 10 may be stored in memory 6. ROI configuration information (ROI config) 35 may include indications of the locations of the ROIs for an image. ROI configuration information 35 may be accessed by both processor 3 and display processor 10.

Display processor 10 and processor 3 may be configured to determine whether display subsystem pipeline 11 introduces any errors as an image is processed through display subsystem pipeline 11 of buffer logic 14, fetch logic 16, source surface processor pipes 18, layer mixer 20, and DSPP 22. If display processor 10, using comparator circuit 24, determines that display subsystem pipeline 11 introduces an error to a processed image, then the user of display system 2 may not be able to safely rely on what is displayed by display device 12 as an accurate representation of, for example, the video frames captured by video sources 4.

In one example of the disclosure, compactor circuit 24 may compare data check integrity values and determine that display processor 10 introduced an error the difference between data integrity check values is greater than some threshold. That is, in some examples, the compared data integrity check values need not be identical to determine that display processor 10 is functioning normally.

In other examples, comparator circuit 24 may simply compare data check integrity values and determine whether or not they are different. The comparator circuit may be configured to generate an interrupt if a threshold number of contiguous comparisons (e.g., comparisons of data integrity check values for contiguous frames) in a row all indicate an error. Accordingly, in this example, the threshold may be the number of contiguous errors detected before comparator circuit 24 generates an interrupt indicating an error.

Display processor 10 may perform a built-in self-test of display subsystem pipeline 11 to test the integrity of display subsystem pipeline 11. In general, a built-in self-test may be a set of structured techniques for testing the integrity of a set of one or more hardware logic blocks/circuits (e.g., hardware units) of display processor 10. In the example of FIG. 2, display processor 10 may perform a built-in self test of the hardware units display subsystem pipeline 11, such as buffer logic 14, fetch logic 16, source surface processor pipes 18, layer mixer 20, and DSPP 22 making up display subsystem pipeline 11, to detect faults in display subsystem pipeline 11, by determining whether display processor 10, while processing an image, introduces an error into the image. If display processor 10 determines that display subsystem pipeline 11 introduces an error into the image, then display processor 10 may detect a fault within one of the hardware logic blocks of display subsystem pipeline 11 and may issue an error/interrupt 40.

In some display systems, a data integrity check value may be generated for an entire incoming frame to a display system. Such a data integrity check value may be a CRC code, checksum, hash value or other type of value generated to check the validity of raw data (e.g., image data). Such a check value may be a multiple independent signature register (MISR), a linear feedback shift register (LFSR), and the like, though other techniques may be used. However, such a data integrity check value is only generated prior to any display processing by a display processor.

To ensure the integrity of image data after being processed by display processor 10, this disclosure proposes generating a data integrity check value (e.g., a CRC code, MISR, etc.) based on a software model 37 of the processing to be performed by display processor 10. For example, processor 3 may process one or more regions-of-interest (ROI) of input image data (e.g., safety critical image data as indicated by ROI config 35) with software model 37. Software model 37 models the behavior of the hardware units of display processor 10. After processing the ROIs of the input image data through software model 37, processor 3 may calculate input MISR 2 for the resultant image. The input MISR 2 may be stored with an input image and stored in memory 6 and associated with a particular image. In addition, a data integrity check value may be calculated based on the input image before any processing. For example, processor 3 may calculate an input MISR 1 for ROIs of an input image before any processing. The input MISR 1 may be stored with an input image and stored in memory 6 and associated with a particular image. In another example, input MISR 1 may be specified by a user or may be otherwise specified. For example, input MISR 1 may be set at the factory.

The techniques of this disclosure are not limited to calculating data integrity check values at one or two points with a software model of a display processor. Three or more data integrity check values may be calculated by processor 3 using a software model 37 at multiple different points of processing, e.g., corresponding to a plurality of different hardware units of display processor 10 (e.g., buffer logic 14, fetch logic 16, source pipes 18, layer mixer 20, DSPP 22, etc.). For use as a comparison, for each point in a data integrity check value is calculated from ROIs processed by software model 37, display processor 10 may be configured to determine a corresponding data integrity check value at a corresponding processing point (e.g., after processing by a particular hardware unit) in display processor 10.

The image data may then be processed by display processor for eventual display 10. At one or more stages of display processing by display processor 10, additional data integrity check value(s) (MISR 1 and MISR 2) may be calculated for the ROIs of the image to be displayed (i.e., the output image). For example, as shown in FIG. 2, display processor 10 may calculate MISR 1, on the ROIs indicated by ROI config 35, after processing by layer mixer 20. Layer mixer 20 may be configured to perform compositing operations, including blending. Often, the ROIs of the input image (e.g., the safety critical regions of the image) will not be expected to be altered after processing by layer mixer 20. As such, comparator circuit 24 may compare MISR 1 calculated by the display processor to input MISR 1 calculated by processor on the input image.

In addition, display processor 10 may calculate MISR 2, on the ROIs indicated by ROI config 35, after processing by DSPP 22. DSPP 22 typically alters the ROI's content of the input image, e.g., by adjusting hue, saturation, brightness, etc. As such, and as described above, processor 3 may apply software model 37 to the ROIs of the input image to generate an input MISR 2. Software model 37 may be configured to model the behavior of hardware units of display processor 10, including DSPP 22. Comparator circuit 24 may also be configured to compare the input MISR 2 to the MISR 2 calculated by display processor 10. If all of the input MISR values or MISR values generated by display processor 10 match (e.g., within some margin for error), the output image is determined to be correct and is displayed. If any of the input MISR values or MISR values generated by display processor 10 do not match (e.g., are outside some margin for error), comparator circuit 24 may generate an error/interrupt 40. The error/interrupt 40 may cause display system 2 to generate an auditory, visual, haptic, or other alert to a user. Error/interrupt 40 may also cause display system 2 to initiate a recovery process to attempt to fix any processing problems occurring with display processor 10.

In some examples of the disclosure, only the input MISR 2 and MISR 2 are calculated for ROIs of a particular image. In another example of the disclosure, input MISR 1, input MISR 2, MISR 1, and MISR 2 are calculated for ROIs of a particular image. That is, in some examples, it may only be desirable to compare a data integrity check value calculated after processing through software model 37 to a data integrity check value calculated after processing through DSPP 22 of display processor 10, or more generally processed through the last hardware block of display processor 10. However, in other examples, it may be desirable to compare multiple data integrity check values at various stages of processing by display processor 10, including comparing data integrity check values after processing by hardware blocks of display processor 10 that generally do not alter the image content (e.g., layer mixer 20), and after hardware blocks of display processor 10 that generally do alter the image content (e.g., DSPP 22). In this way, multiple data integrity check values may provide for an easier mechanism to determine where in display processor 10 errors are being introduced.

Display system 2 may perform concurrent online testing of display processor 10 using the techniques discussed above. In other words, display system 2 may perform the built-in self test of display processor 10 while display system 2 is powered-on and performing the functionality of display system 2. For example, display system 2 may perform concurrent online testing of display processor 10 while video sources 4 capture a real-time video and as display system 2 outputs, via display device 12, the real time video captured by video sources 4.

Because display system 2 performs the built-in self-test concurrently and online, display system 2 does not perform the built-in self test by entering into a dedicated test mode. Instead, such a test is performed while display system 2 is powered-on and operating to perform its normal functionality, such as displaying on display device 12 the live video that is captured by video sources 4. If comparator circuit 24 determines that, during the built-in self-test, display subsystem pipeline 11 has modified an image in an unexpected way (e.g., input MISR 2 value does not match MISR 2 value within a threshold) while it processes the image through the display subsystem pipeline 11, comparator circuit 24 may determine that one or more hardware units of the display subsystem pipeline is not operating properly, and may thereby detect that a fault in display processor 10.

Display interface controller 23 may be configured to send any images or content processed by displayed processor 10 to a display. In some examples, displayer interface controller 23 may be configured to provide both image content as well as MISR 1 and MISR 2 (e.g., the data integrity check values) to a timing controller (TCON) of a display. As will be discussed with reference to FIG. 3, in some examples, the TCON of a display may also be configured to calculate data integrity check values and compare them to the data integrity check values calculated by processor 3 (e.g., input MISR 1 and input MISR 2) and display processor 10 (e.g., MISR 1 and MISR 2).

Figure 3:
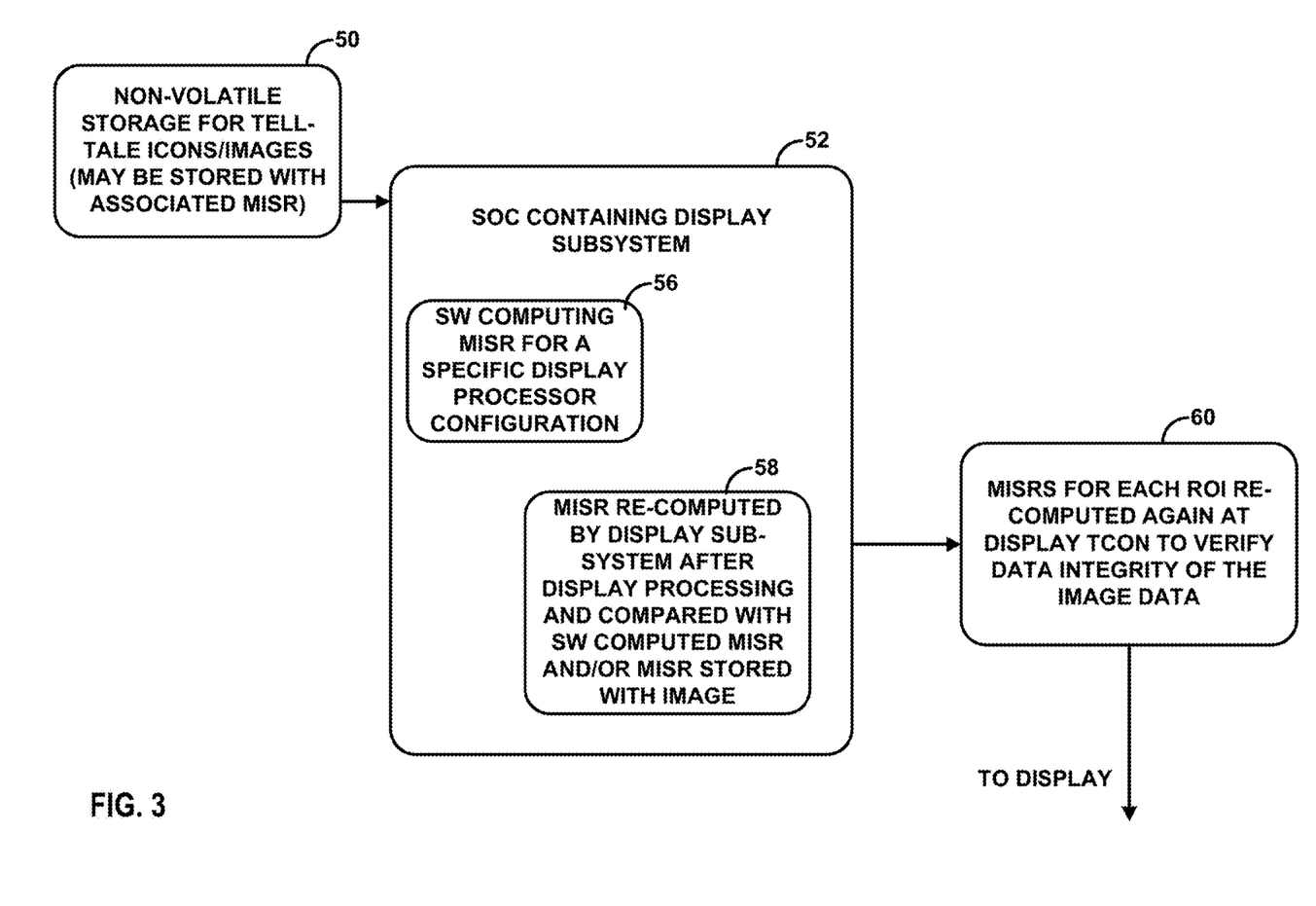
FIG. 3 is a flowchart illustrating one example method of this disclosure.

FIG. 3 is a flowchart illustrating one example method of this disclosure. In the example of FIG. 3, data integrity check values (e.g., MISRs) may be calculated and/or stored for ROIs of an image at every stage of processing of the image. Such a technique provides end-to-end integrity check on the validity of safety critical ROIs of image data. In the example of FIG. 3, a non-volatile storage (e.g., memory 6 of FIG. 1) may store images that include safety-critical ROIs (e.g., tell-tale icons of an instrument cluster), and such ROIs may be stored with associated MISR values (50). A system-on-chip (SoC) 52 may include both a processor and a display processor (e.g., processor 3 and display processor 10 of FIG. 1). SoC 52 may calculate MISRs on the ROIs of the image using a software model (e.g., software model 37) of a specific display processing configuration (56). SOC 52 may also re-compute the MISRs of the ROIs of the image using a display subsystem, after display processing, and may compare the re-computed MISRs (e.g., MISR 1 and MISR 2) to the MISRs stored with the ROIs of the image and the MISRs calculated by the software model of the display processor configuration (e.g., input MISR 1 and input MISR 2) (58). For yet another data integrity check, a TCON of a display may re-compute the MISRs again for the ROIs of the image to again verify data integrity for actual display (60).

In this way, ROI-based MISRs can be used to confirm data integrity even when passing through a hardware processor (e.g., display processor 10) that may purposefully modify the data within the ROI. As discussed above, this is accomplished by using a CPU (e.g., processor 3) modelling the hardware behavior (e.g., the configuration of display processor 10) using full knowledge of the design and its configuration. Using this model, software running on the CPU is able to compute what the modified MISR is expected to be after processing by the display processor. This expected MISR is then provided to the hardware (e.g., display processor 10) which compares the expected MISR against the MISR computed from the actual data coming out of the hardware pipeline (e.g., display subsystem pipeline 11). If there's a mismatch, an error/interrupt is generated by the comparison hardware.

The techniques described above allow data integrity to be confirmed without using error-correcting code (ECC) memory, which is often not present in display subsystems. In addition, the techniques of this disclosure may be used during normal system operation without entering a dedicated test mode. Furthermore, the techniques of this disclosure may be implemented with minimal impact to die area of an SoC. Also, the techniques of this disclosure may be implemented and employed at the full processing speed of a display processor. That is, the data integrity checks may occur concurrently with actual operation of the display subsystem. The data integrity checks of this disclosure are able to detect both permanent faults and intermittent faults because data integrity testing may be done concurrently and online. In addition, the data integrity checks of this disclosure may enable vehicle manufacturers and vehicle systems manufacturers to achieve hardware architectural metrics as per ISO 26262 functional safety standard (Single Point Fault Metric (SPFM) and Latent Point Fault Metric (LPFM)).

Figure 4:
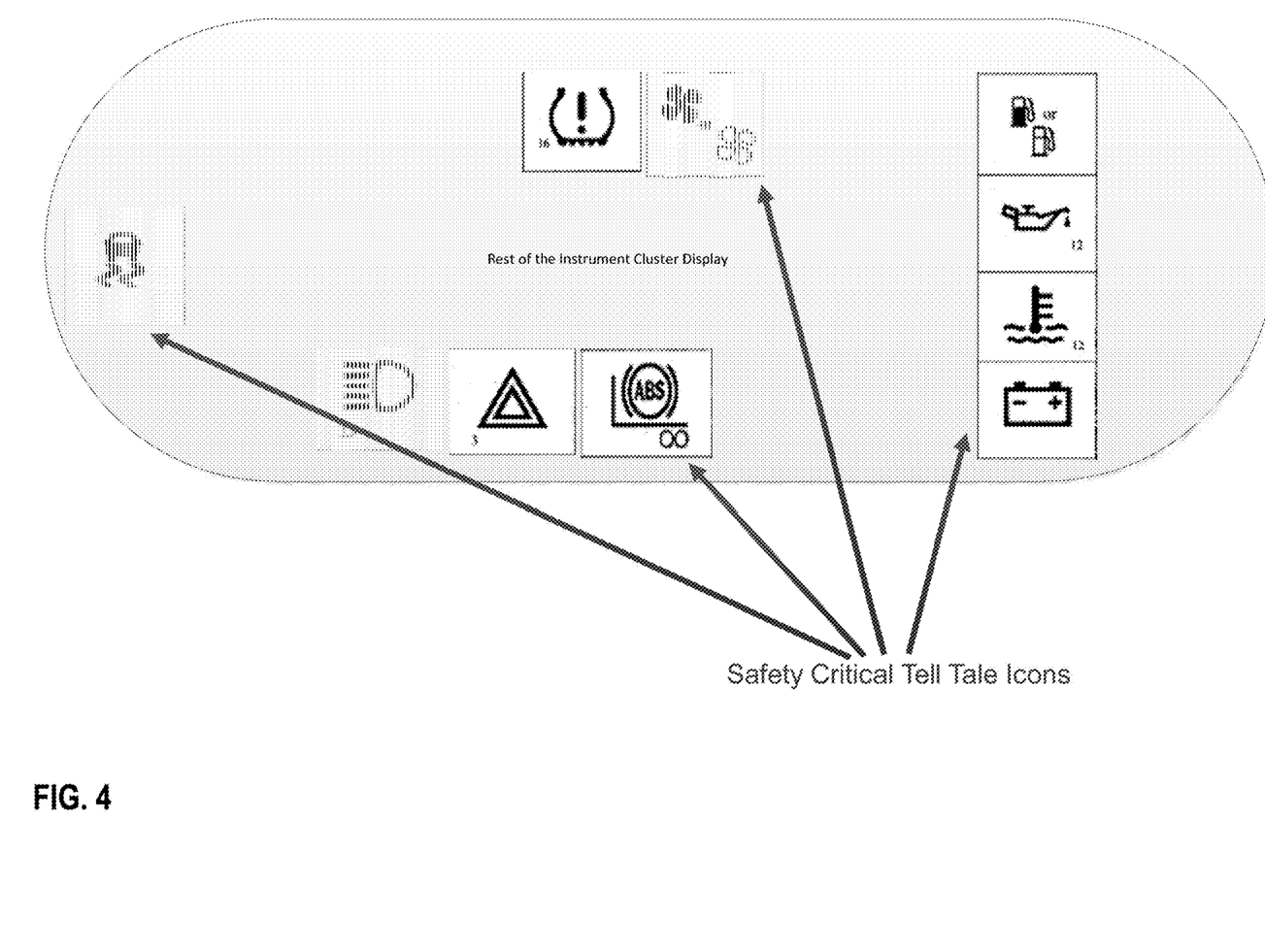
FIG. 4 is a conceptual diagram illustrating example tell-tale icons.

FIG. 4 is a conceptual diagram illustrating example tell-tale icons. The tell-tale icons may be shown in one or more displays (or instrument panels including displays) that serve as instrument clusters or other information conveying displays working in conjunction with an ADAS of a vehicle. As shown in FIG. 4, an instrument may display various tell-tale icons that may indicate the operational state of the vehicle and/or warnings. Example tell-tale icons in FIG. 4 include tell-tale icons for traction control, tire pressure, fan speed, fuel gauge, oil pressure, water temperature, battery voltage, anti-lock braking system (ABS), emergency lights, high beam head lights, and the like.

Figure 5:
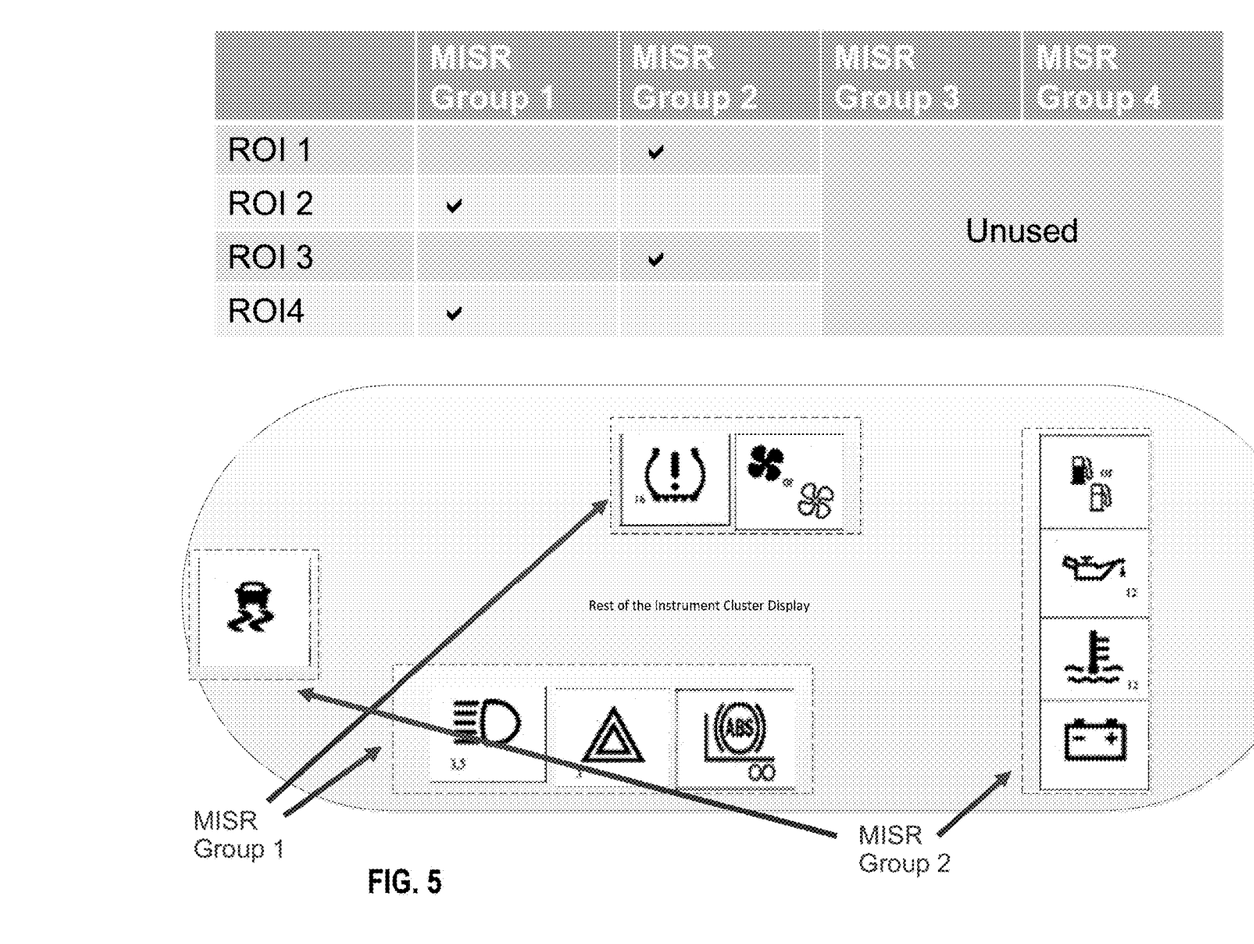
FIG. 5 is a conceptual diagram illustrating tell-tale icons grouped into regions-of-interest.

FIG. 5 is a conceptual diagram illustrating tell-tale icons grouped into regions-of-interest. As shown in FIG. 5, the tell-tale icons shown in FIG. 4 may be divided into different groups of ROIs. Processor 3 and display processor 10 may compute MISR values in accordance with the techniques above on each of the 4 different ROIs shown in FIG. 5. For example, ROI 1 may include the traction control tell-tale icon, ROI 2 may include the tire pressure and fan speed tell-tale icons, ROI 3 may include the high beam, emergency light, and ABS tell-tale icons, and ROI 4 may include the gas gauge, oil pressure, water temperature, and battery voltage tell-tale icons. The ROIs in FIG. 5 are just an example. Tell-tale icons may be grouped together into any different combinations of ROIs as would be practical for a given instrument cluster.

In some examples, processor 3 and display processor 10 may be configured to calculate MISRs for each of ROIs 1-4 individually. However, in other examples, individual ROIs may be grouped together and processor 3 and display processor 10 may be configured to calculate MISRs on each group of ROIs. As shown in FIG. 5, ROI 1 and ROI 3 may be included in a MISR Group 2, and ROI 2 and ROI 4 may be included in a MISR Group 1.

Figure 6:
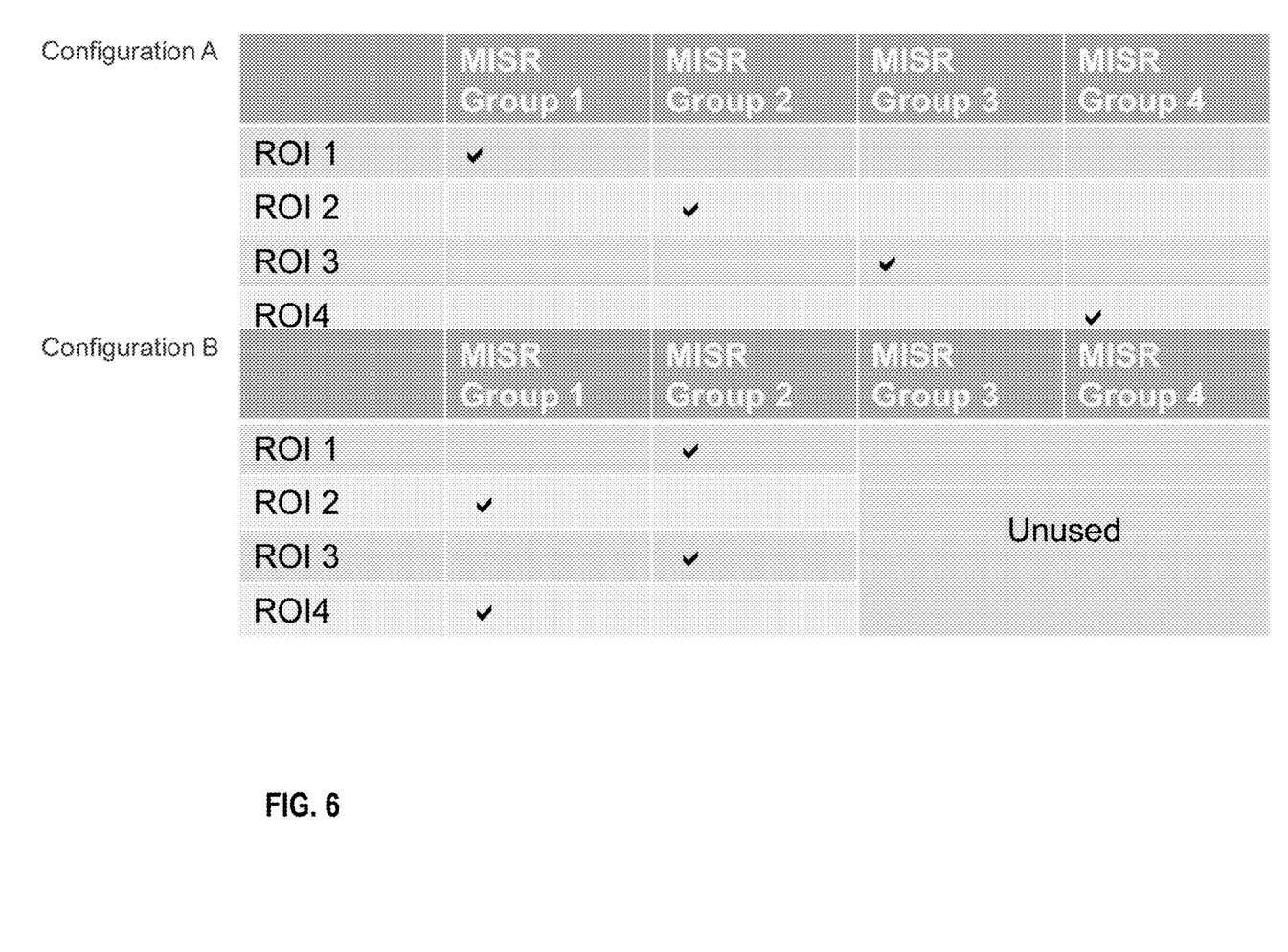
FIG. 6 is a table showing example groupings of regions-of-interest.

FIG. 6 is a table showing example groupings of ROIs. In configuration 1, each ROI is a separate MISR Group. In configuration A, processor 3 and display processor 10 may be configured to calculate MISRs for each of the ROIs. In configuration B, processor 3 and display processor 10 may calculate MISRs on the grouped ROIs, as discussed above.

Figure 7:
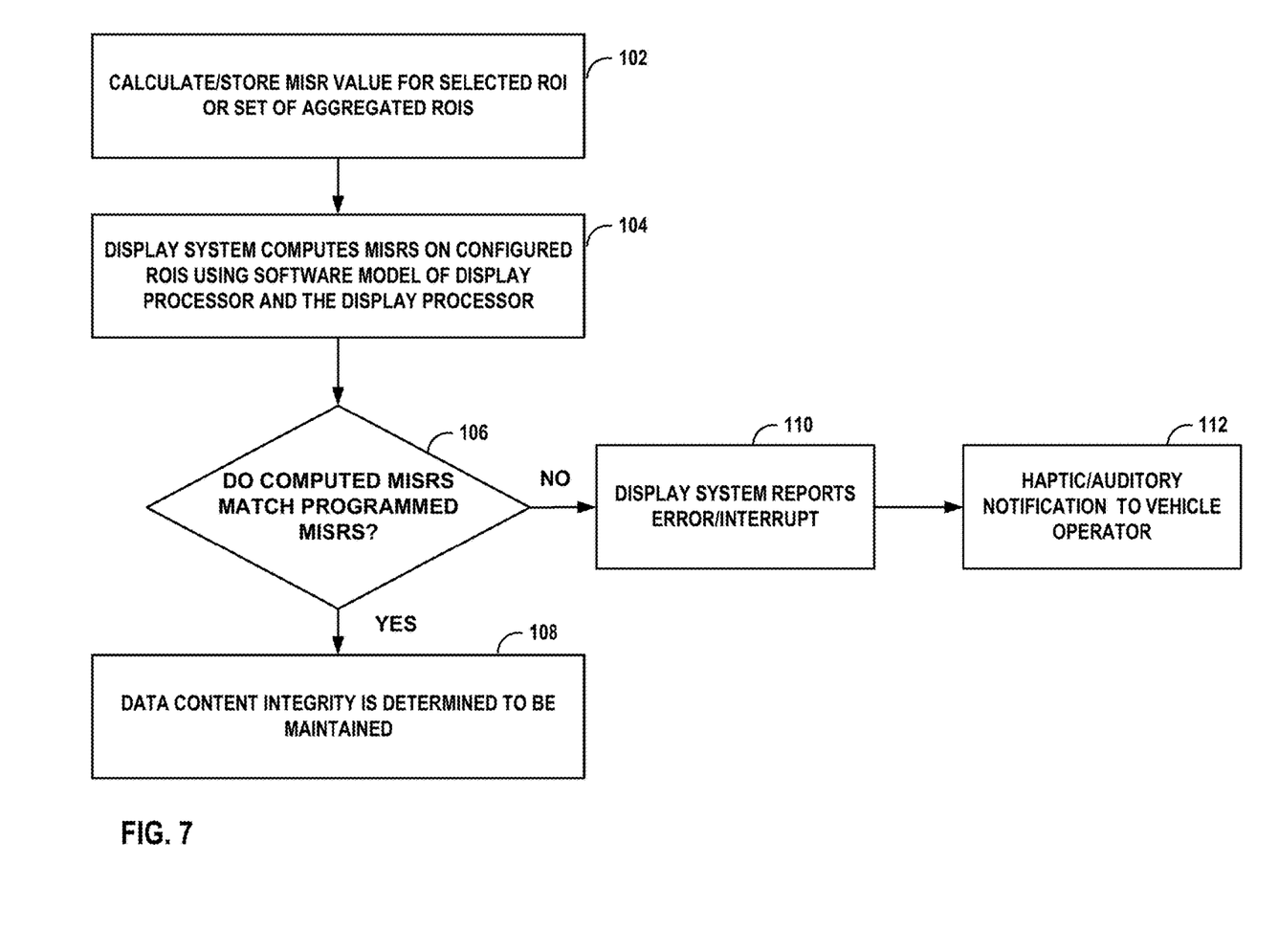
FIG. 7 is a flowchart illustrating another example method of this disclosure.

FIG. 7 is a flowchart illustrating another example method of this disclosure. Display system 2 of FIG. 1 may be configured to perform the techniques of FIG. 7. Processor 3 may be configured to calculate and/or store MISR values for a selected ROI or set of aggregated (e.g., grouped) ROIs of an image (102). Processor 3 of display system 2 may also be configured to compute MISRs on the user-configured ROIs (e.g., the selected ROIs or aggregated ROIs) using a software model of a display processor (104). In addition, at one or more stage of display processing, display processor 10 may also compute MISRs for the ROIs (104). Display system 2, for example, using display processor 10, may that determine whether or not the ROIs computed by the software model of the display processor match (e.g., within some predetermined threshold) the MISRs calculated at the one more stages of display processing (106). If the MISRs match, display system 2 determines that the data content integrity has been maintained (108). If the MISRs do not match, display system 2 may report an error/interrupt (110). Display system 2 may then issue a haptic, audio, and/or visual notification to the vehicle operator (112).

It should be understood that FIG. 7 is just one example of a method according to the techniques of the disclosure. Display system 2 may be configured to perform other variations of the general method of FIG. 7 consistent with the techniques of this disclosure.

In one example, processor 3 of display system 2 may be configured to process one or more ROI of an input image through software model 37 of display processor 10, and calculate a first data integrity check value (e.g., input MISR 2 of FIG. 2) on the one or more ROI of the input image after processing through software model 37 of display processor 10. Display processor 10 may be configured to process the input image, and calculate a second data integrity check value (e.g., MISR of FIG. 2) on the one or more ROI after display processor 10 processes the input image. Comparator 24 may be configured to compare the first data integrity check value to the second data integrity check value, and generate an interrupt (e.g., interrupt 40 of FIG. 2) if the comparison indicates that the first data integrity check value and the second data integrity check value do not match within a predetermined margin of error.

In one example of the disclosure, display processor 10 may be configured to process the input image using a first hardware block (e.g., layer mixer 20 of FIG. 2) that does not alter content in the one or more ROI of the input image, and process the input image using a second hardware block (e.g., DSPP 22 of FIG. 2) that does alter the content in the one or more ROI of the input image. In one example of the disclosure, display processor 10 may be configured to calculate the second data integrity check value after processing the input image by the second hardware block.

In another example of the disclosure, processor 3 may be configured to calculate a third data integrity check value (e.g., input MISR 1 of FIG. 2) on the one or more ROI of the input image before processing the input image through software model 37 of display processor 10 and before processing the input image by display processor 10. Display processor 10 may be configured to calculate a fourth data integrity check value (e.g., MISR 1 of FIG. 2) on the one or more ROI of the input image after processing the input image by first hardware block (e.g., layer mixer 20 of FIG. 2) of display processor 10, but before processing the input image by a second hardware block (e.g., DSPP 22 of FIG. 2) of display processor 10. Comparator 24 may be configured to compare the third data integrity check value to the fourth data integrity check value, and generate an interrupt if the comparison indicates that the third data integrity check value and the fourth data integrity check value do not match within a predetermined margin of error.

In one example of the disclosure, the input image is an image produced by a rearview camera of a vehicle. In another example of the disclosure, the input image is an image to be displayed on an instrument cluster of a vehicle. In another example of the disclosure, the one or more ROI of the input image are tell-tale icons of the instrument cluster. In another example of the disclosure, the one of the one or more ROI of the input image comprise a plurality of tell-tale icons of an instrument cluster.

In one example of the disclosure, display system 2 may be configured to generate one or more of an auditory, visual, or haptic warning in response to generating the interrupt. In a further example of the disclosure, display system 2 may be configured to initiate a recovery process in response to generating the interrupt.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various aspects of the disclosure have been described. These and other aspects are within the scope of the following claims.

The invention claimed is:

1. A method of checking the integrity of an image, the method comprising:
processing one or more regions-of-interest (ROI) of an input image through a software model of a display processor, wherein the software model models the behavior of hardware units of the display processor;
calculating a first data integrity check value on the one or more ROI of the input image after processing through the software model of the display processor;
processing the input image by the display processor;
calculating a second data integrity check value on the one or more ROI by the display processor after the display processor processes the input image;
comparing the first data integrity check value to the second data integrity check value; and
generating an interrupt if the comparison indicates that the first data integrity check value and the second data integrity check value do not match within a predetermined margin of error.

2. The method of claim 1, wherein processing the input image by the display processor comprises:
processing the input image by a first hardware block of the display processor that does not alter content in the one or more ROI of the input image; and
processing the input image by a second hardware block of the display processor that does alter the content in the one or more ROI of the input image.

3. The method of claim 2, wherein calculating the second data integrity check value comprises calculating the second data integrity check value after processing the input image by the second hardware block.

4. The method of claim 2, further comprising:
calculating a third data integrity check value on the one or more ROI of the input image before processing the input image through the software model of the display processor and before processing the input image by the display processor;
calculating a fourth data integrity check value on the one or more ROI of the input image after processing the input image by the first hardware block of the display processor, but before processing the input image by the second hardware block of the display processor;
comparing the third data integrity check value to the fourth data integrity check value; and
generating the interrupt if the comparison indicates that the third data integrity check value and the fourth data integrity check value do not match within a predetermined margin of error.

5. The method of claim 1, wherein the input image is an image produced by a rearview camera of a vehicle.

6. The method of claim 1, wherein the input image is an image to be displayed on an instrument cluster of a vehicle.

7. The method of claim 6, wherein the one or more ROI of the input image are tell-tale icons of the instrument cluster.

8. The method of claim 7, wherein one of the one or more ROI of the input image comprise a plurality of tell-tale icons of an instrument cluster.

9. The method of claim 1, further comprising:
generating one or more of an auditory, visual, or haptic warning in response to generating the interrupt.

10. The method of claim 1, further comprising:
initiating a recovery process in response to generating the interrupt.

11. An apparatus configured to check the integrity of an image, the apparatus comprising:
a processor, a display processor, and a comparison circuit, wherein the processor is configured to:
process one or more regions-of-interest (ROI) of an input image through a software model of a display processor, wherein the software model models the behavior of hardware units of the display processor; and
calculate a first data integrity check value on the one or more ROI of the input image after processing through the software model of the display processor,
wherein display processor is configured to:
process the input image by the display processor; and
calculate a second data integrity check value on the one or more ROI by the display processor after the display processor processes the input image, and
wherein the comparison circuit is configured to:
compare the first data integrity check value to the second data integrity check value; and
generate an interrupt if the comparison indicates that the first data integrity check value and the second data integrity check value do not match within a predetermined margin of error.

12. The apparatus of claim 11, wherein the display processor is further configured to:
process the input image by a first hardware block of the display processor that does not alter content in the one or more ROI of the input image; and
process the input image by a second hardware block of the display processor that does alter the content in the one or more ROI of the input image.

13. The apparatus of claim 12, wherein the display processor is further configured to calculate the second data integrity check value after processing the input image by the second hardware block.

14. The apparatus of claim 12, wherein the processor is further configured to calculate a third data integrity check value on the one or more ROI of the input image before processing the input image through the software model of the display processor and before processing the input image by the display processor,
wherein the display processor is further configured to calculate a fourth data integrity check value on the one or more ROI of the input image after processing the input image by the first hardware block of the display processor, but before processing the input image by the second hardware block of the display processor, and wherein the comparison circuit is further configured to compare the third data integrity check value to the fourth data integrity check value, and generate the interrupt if the comparison indicates that the third data integrity check value and the fourth data integrity check value do not match within a predetermined margin of error.

15. The apparatus of claim 11, the apparatus further comprising:
a display configured to display the input image after processing by the display processor.

16. The apparatus of claim 15, the apparatus further comprising:
a rearview camera, wherein the input image is an image produced by a rearview camera of a vehicle.

17. The apparatus of claim 15, wherein the input image is an image to be displayed on an instrument cluster of a vehicle.

18. The apparatus of claim 17, wherein the display is configured to display the instrument cluster, and wherein the one or more ROI of the input image are tell-tale icons of the instrument cluster.

19. The method of claim 18, wherein one of the one or more ROI of the input image comprise a plurality of tell-tale icons of the instrument cluster.

20. The apparatus of claim 11, wherein the processor is further configured to generate one or more of an auditory, visual, or haptic warning in response to generating the interrupt.

21. The apparatus of claim 11, wherein the processor is further configured to initiate a recovery process in response to generating the interrupt.

22. The apparatus of claim 11, wherein the processor, the display processor, and the comparison circuit are part of an advanced driver assistance system (ADAS) of a vehicle.

23. An apparatus configured to check the integrity of an image, the apparatus comprising:
means for processing one or more regions-of-interest (ROI) of an input image through a software model of a display processor, wherein the software model models the behavior of hardware units of the display processor;
means for calculating a first data integrity check value on the one or more ROI of the input image after processing through the software model of the display processor;
means for processing the input image by the display processor;
means for calculating a second data integrity check value on the one or more ROI by the display processor after the display processor processes the input image;
means for comparing the first data integrity check value to the second data integrity check value; and
means for generating an interrupt if the comparison indicates that the first data integrity check value and the second data integrity check value do not match within a predetermined margin of error.

24. The apparatus of claim 23, wherein the means for processing the input image by the display processor comprises:
means for processing the input image by a first hardware block of the display processor that does not alter content in the one or more ROI of the input image; and
means for processing the input image by a second hardware block of the display processor that does alter the content in the one or more ROI of the input image.

25. The apparatus of claim 24, wherein the means for calculating the second data integrity check value comprises means for calculating the second data integrity check value after processing the input image by the second hardware block.

26. The apparatus of claim 24, further comprising:
means for calculating a third data integrity check value on the one or more ROI of the input image before processing the input image through the software model of the display processor and before processing the input image by the display processor;
means for
means for comparing the third data integrity check value to the fourth data integrity check value; and
means for generating the interrupt if the comparison indicates that the third data integrity check value and the fourth data integrity check value do not match within a predetermined margin of error.

27. A non-transitory computer-readable storage medium storing instructions that, when executed, cause one or more processors to:
process one or more regions-of-interest (ROI) of an input image through a software model of a display processor, wherein the software model models the behavior of hardware units of the display processor;
calculate a first data integrity check value on the one or more ROI of the input image after processing through the software model of the display processor;
process the input image by the display processor;
calculate a second data integrity check value on the one or more ROI by the display processor after the display processor processes the input image;
compare the first data integrity check value to the second data integrity check value; and
generate an interrupt if the comparison indicates that the first data integrity check value and the second data integrity check value do not match within a predetermined margin of error.

28. The non-transitory computer-readable storage medium of claim 27, wherein to process the input image by the display processor, the instructions further cause the one or more processors to:
process the input image by a first hardware block of the display processor that does not alter content in the one or more ROI of the input image; and
process the input image by a second hardware block of the display processor that does alter the content in the one or more ROI of the input image.

29. The non-transitory computer-readable storage medium of claim 28, wherein the instructions further cause the one or more processors to calculate the second data integrity check value after processing the input image by the second hardware block.

30. The non-transitory computer-readable storage medium of claim 28, wherein the instructions further cause the one or more processors to:
calculate a third data integrity check value on the one or more ROI of the input image before processing the input image through the software model of the display processor and before processing the input image by the display processor;
calculate a fourth data integrity check value on the one or more ROI of the input image after processing the input image by the first hardware block of the display processor, but before processing the input image by the second hardware block of the display processor;

compare the third data integrity check value to the fourth data integrity check value; and generate the interrupt if the comparison indicates that the third data integrity check value and the fourth data integrity check value do not match within a predetermined margin of error.

* * * * *